(12) United States Patent
Yi et al.

(10) Patent No.: US 8,983,305 B2
(45) Date of Patent: Mar. 17, 2015

(54) METHOD AND APPARATUS FOR CONTROLLING PHASE DELAY OFFSET POINT OF MODULATOR (75) Inventors: Hong Yi, Shenzhen (CN); Jianhong Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 243 days.

(21) Appl. No.: 13/637,181

(22) PCT Filed: Aug. 17, 2010

(86) PCT No.: PCT/CN2010/076052
§ 371 (c)(1),
(2), (4) Date: Sep. 25, 2012

(87) PCT Pub. No.: WO2011/120275
PCT Pub. Date: Oct. 6, 2011

(65) Prior Publication Data
US 2013/0022153 A1   Jan. 24, 2013

(30) Foreign Application Priority Data
Mar. 30, 2010   (CN) .......................... 2010 1 0140013

(51) Int. Cl.
*H04B 10/04* (2006.01)
*H04B 10/12* (2006.01)
*H04L 27/20* (2006.01)
*H04L 27/00* (2006.01)

(52) U.S. Cl.
CPC ..... *H04L 27/2071* (2013.01); *H04L 2027/0018* (2013.01); *H04L 2027/0051* (2013.01)
USPC .......................................... 398/188; 398/198

(58) Field of Classification Search
None
See application file for complete search history.

(56) References Cited

U.S. PATENT DOCUMENTS

2008/0187324 A1* 8/2008 Akiyama et al. .............. 398/188
2009/0115544 A1* 5/2009 Kershteyn et al. ............ 332/103

FOREIGN PATENT DOCUMENTS

CN   101150370 A   3/2008
CN   101254515 A   1/2009

* cited by examiner

*Primary Examiner* — Ken Vanderpuye
*Assistant Examiner* — Merlin Brito Peguero
(74) *Attorney, Agent, or Firm* — Porter Wright Morris & Arthur, LLP (57) ABSTRACT

The present invention provides a method and an apparatus for controlling a phase delay offset point of a modulator. The method comprises: acquiring backlight detection current signals output from a modulator in different working states, and determining harmonic amplitude values of the backlight detection current signals corresponding to the different working states; determining a detection value of a phase delay offset point corresponding to the modulator according to the determined harmonic amplitude values; comparing the detection value with a set target value of the phase delay offset point, and controlling a position of the phase delay offset point corresponding to the modulator according to the comparison result. The accuracy of controlling the position of the phase delay offset point of the modulator and the performance of the Differential Quadrature Phase Shift Keying (DQPSK) modulation system are improved through the technical solution.

9 Claims, 7 Drawing Sheets

METHOD AND APPARATUS FOR CONTROLLING PHASE DELAY OFFSET POINT OF MODULATOR

FIELD OF THE INVENTION

The present invention relates to the technical field of communications, in particular to a method and an apparatus for controlling a phase delay offset point of a modulator.

BACKGROUND OF THE INVENTION

In recent years, with the improvement of speed and the increase of capacity in optical transmission systems, more and more attention has been paid to an optical phase modulation method represented by Differential Quadrature Phase Shift Keying (DQPSK) modulation. In the DQPSK modulation, four different phases of an optical wave are used for representing different data signals, so a code element speed thereof is only half of that of traditional optical amplitude modulation, therefore requirements on optical devices are reduced a lot. Besides, with more excellent dispersion and polarization mode dispersion performance with respect to the optical amplitude modulation, the DQPSK modulation is better suited to large-capacity and long-distance optical transmission systems.

In the optical fibre communication, an optical carrier can be generally expressed as: $E_i = E \exp j[\omega_0 t + \phi(t)]$, wherein E refers to field strength, $\omega_o$ refers to an angular frequency of the optical carrier, and $\phi(t)$ refers to a modulation phase. The basic working principle of the DQPSK modulation is: information to be transmitted is encoded in a differential phase, which is expressed by $\Delta\phi$, of continuous optical bits, wherein $\Delta\phi$ can be any value in $[0, \pi/2, \pi, 3\pi/2]$. Assumed that the pahse of the $k-1^{th}$ optical bit pulse is $\theta(k-1)$, if the adjacent bit is $\{0, 0\}$, $\theta(k)=\theta(k-1)+\pi$; if the adjacent bit is $\{0, 1\}$, $\theta(k)=\theta(k-1)+\pi/2$; of the adjacent bit is $\{1, 1\}$, $\theta(k)=\theta(k-1)$; if the adjacent bit is $\{1, 0\}$, $\theta(k)=\theta(k-1)+3\pi/2$.

In the DQPSK modulation system, a common modulator is a lithium niobate modulator, however, during the practical application, due to the property of the material of the lithium niobate modulator, i.e., relatively high sensitivity to both temperature and stress, in order to realize accurate phase control, certain peripheral control circuits are required. At present, there are two common control methods. The first method is: pilot signals in different frequencies are set on arms I and Q of a lithium niobate modulator, then backlight detection signals are acquired and difference-frequency signals contained in the backlight detection signals are filtered, when the difference-frequency signals disappear, the lithium niobate modulator is locked to a common offset point. The defect of this method is that, as the output amplitude of the difference-frequency signals is very small, it is very difficult to accurately detect whether the difference-frequency signals disappear really, thus the accuracy of controlling the position of the offset point is influenced. The second method is: the backlight detection signals are directly sampled, whether there are Radio Frequency (RF) harmonic signals, which is in the same rate as a data bit stream, contained in the backlight detection signals is judged, when the setup of the offset point makes the RF harmonic signal has the minimum power, it is determined that the current offset point is in a normal locked state. The defect of this method is that the circuit design is relatively complex, furthermore, the implementation cost is relatively high, and the feasibility is relatively low.

No matter which control method is employed to control the offset point of the lithium niobate modulator, the implementation of peripheral control circuits directly influences the performance of the whole DQPSK modulation system, the above two methods have low accuracy of controlling the phase delay offset point of the lithium niobate modulator, as a result, the performance of the whole DQPSK modulation system is degraded.

SUMMARY OF THE INVENTION

In view of the above, the embodiments of the present invention provide a method and an apparatus for controlling a phase delay offset point of a modulator, so that the accuracy of controlling the phase delay offset point of the modulator is improved.

The present invention is implemented through the following technical solutions.

The present invention provides a method for controlling a phase delay offset point of a modulator, comprising:

acquiring backlight detection current signals output from the modulator in different working states, and determining harmonic amplitude values of the backlight detection current signals corresponding to the different working states;

determining a detection value of the phase delay offset point corresponding to the modulator according to the determined hattnonic amplitude values; and comparing the detection value with a set target value of the phase delay offset point, and controlling a position of the phase delay offset point corresponding to the modulator according to a comparison result.

The present invention also provides an apparatus for controlling a phase delay offset point of a modulator, comprising: a signal acquisition unit, a harmonic amplitude value determination unit, a detection value determination unit, a comparison unit and a control unit; wherein the signal acquisition unit is configured to acquire backlight detection current signals output from the modulator in different working states;

the harmonic amplitude value determination unit is configured to determine harmonic amplitude values of the backlight detection current signals that are corresponding to the different working states and are acquired by the signal acquisition unit;

the detection value determination unit is configured to determine a detection value of the phase delay offset point corresponding to the modulator according to the harmonic amplitude values determined by the harmonic amplitude value determination unit;

the comparison unit is configured to compare the detection value determined by the detection value determination unit with a set target value of the phase delay offset point; and the control unit is configured to control a position of the phase delay offset point corresponding to the modulator according to a comparison result made by the comparison unit.

Through at least one technical solution provided in the embodiments of the present invention, according to the backlight detection current signals output from a modulator in different working states, the respective harmonic amplitude values are determined, further a detection value of the phase delay offset point is determined according to the determined harmonic amplitude values, and the position of the phase delay offset point corresponding to the modulator is controlled according to the comparison between the detection value and the set target value of the phase delay offset point. According to the technical solution, on one hand, the position of the offset point is controlled according to the value output from the modulator in the practical working state, in consideration of interference from various external factors to the modulator; on the other hand, the working state of the modulator can be set flexibly, and the test value of the phase delay offset point can be determined in combination of output values in various working states, so that the accuracy of controlling the position of the phase delay offset point of the modulator and the performance of the DQPSK system are improved.

Other features and advantages of the present invention will be described in the following description and partly become obvious from the description, or be understood by implementing the present invention. The objects and other advantages of the present invention can be realized and obtained through the structures indicated by the description, claims and drawings.

DETAILED DESCRIPTION OF THE EMBODIMENTS

In order to provide an implementation solution to improve the accuracy of controlling the offset point of a modulator, the embodiments of the present invention provide a method and an apparatus for controlling the phase delay offset point of a modulator, the basic solution is that: backlight detection current signals output from a modulator in different working states are acquired, and harmonic amplitude values of the backlight detection current signals corresponding to the different working states are determined; a detection value of a phase delay offset point corresponding to the modulator is determined according to the determined harmonic amplitude values; the detection value is compared with a set target value of the phase delay offset point, and a position of the phase delay offset point corresponding to the modulator is controlled according to the comparison result.

The preferable embodiments are described in conjunction with the drawings as follows. It shall be understood that the preferable embodiments described herein are only used to describe and explain the present invention and shall not be construed as improper limitations on the same. The embodiments of the present application and the features of the embodiments can be combined with each other if there is no conflict.

Figure 1:
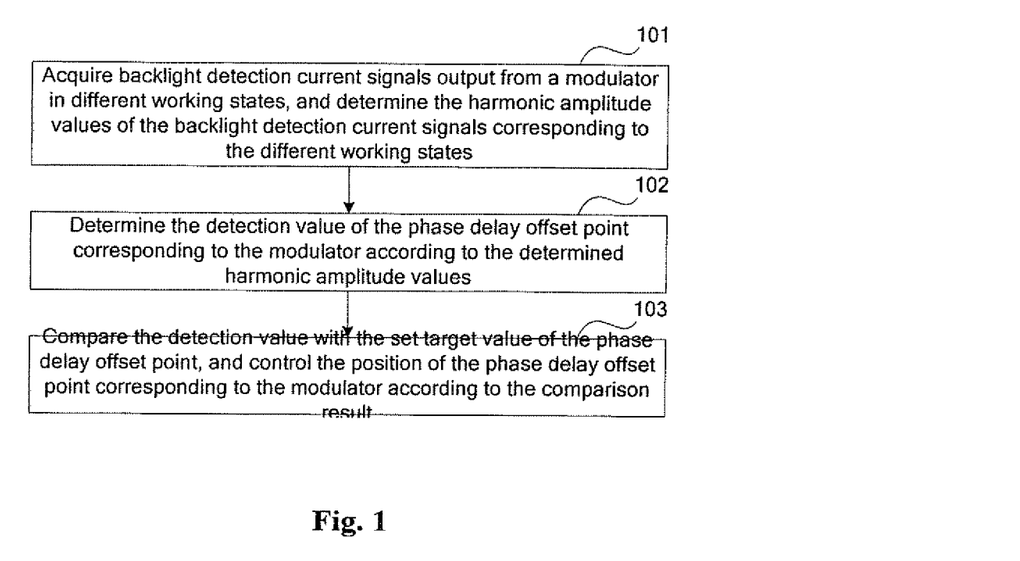
FIG. 1 is a flow chart of a method for controlling a phase delay offset point of a modulator in accordance with an embodiment of the present invention.

FIG. 1 is a flow chart of a method for controlling the phase delay offset point of a modulator in accordance with an embodiment of the present invention. As shown in FIG. 1, the method comprises the following steps.

Step 101: Backlight detection current signals output from a modulator in different working states are acquired, and harmonic amplitude values of the backlight detection current signals corresponding to the different working states are determined.

Step 102: A detection value of the phase delay offset point corresponding to the modulator is determined according to the determined harmonic amplitude values.

Step 103: The detection value is compared with a set target value of the phase delay offset point, and a position of the phase delay offset point corresponding to the modulator is controlled according to the comparison result.

In the method, the working states of the modulator can be set flexibly according to the control requirements. In a preferable embodiment of the present invention, the different working states can be: a state in which no pilot signal is input to the modulator; and a state in which two different phase shift pilot signals are time-sharing superposed to the modulator. Furthermore, preferably, the phase shift of one of the pilot signals superposed to the modulator can be 0, in this way, the computation can be reduced, and further the control efficiency can be improved. During the practical application, superposing the pilot signals to the modulator means superposing the pilot signals to I and Q paths of offset voltage signals of the modulator.

In Step 101, the step of determining the harmonic amplitude values of the backlight detection current signals corresponding to the different working states comprises: determining the harmonic amplitude values of the backlight detection current signals that are corresponding to the different working states after being filtered.

Specifically, the haimonic amplitude values of the backlight detection current signals corresponding to the different working states can be determined through the following formula:

$$|E_{out}|^2 = \frac{|E_i|^2}{4}\left[\sin^2\frac{\pi(V_{d,I}+V_{b,I})}{2V_{\pi,I}} + \sin^2\frac{\pi(V_{d,Q}+V_{b,Q})}{2V_{\pi,Q}} - 2\sin\frac{\pi(V_{d,I}+V_{b,I})}{2V_{\pi,I}}\sin\frac{\pi(V_{d,Q}+V_{b,Q})}{2V_{\pi,Q}}\cos(2\varphi_{IQ}+k\cos(\omega t+\theta))\right]$$

Wherein $V_{d,I}, V_{\pi,I}, V_{b,I}$ respectively refer to a modulation amplitude, $V_\pi$ voltage and an offset voltage of an I-path of the modulator, and are respectively set by a system;

$V_{d,Q}, V_{\pi,Q}, V_{b,Q}$ respectively refer to a modulation amplitude, $V_\pi$ voltage and an offset voltage of a Q-path of the modulator, and are respectively set by the system;

when the corresponding working state is the state in which no pilot signal is input to the modulator, $\omega=0$, $\theta=0$;

when the corresponding working state is the state in which the two different phase shift pilot signals are time-sharing superposed to the modulator, $\omega \neq 0$, the value of $\theta$ can be set according to practical requirements, and the pilot signals superposed to the modulator in two times use different θ values.

In Step 102, the step of determining the detection value of the phase delay offset point corresponding to the modulator according to the harmonic amplitude values determined in Step 101 comprises: jointly solving the equation set formed by the harmonic amplitude values of the backlight detection current signals corresponding to different working states to obtain the detection value $2\phi_{IO}$ of the phase delay offset point corresponding to the modulator, the specific process will be described in details in the following embodiments and will not be described herein.

In Step 103, the position of the phase delay offset point corresponding to the modulator is controlled according to the comparison result, preferably, the control can be implemented through any one of the following control modes:

Control mode 1: controlling directly according to the current comparison result, specifically:

if determining that the difference value between the detection value and the target value is less than a set threshold according to the current comparison result, controlling the phase delay offset point corresponding to the modulator as the current phase delay offset point of the modulator and locking; if determining that the difference value between the detection value and the target value is not less than the set threshold according to the current comparison result, adjusting the phase delay offset point corresponding to the modulator within the range of the difference value.

Control mode 2: controlling according to the current comparison result and the subsequently determined comparison result, specifically:

if determining that the difference value between the detection value and the target value is less than a set threshold according to the current comparison result, controlling the phase delay offset point corresponding to the modulator as the current phase delay offset point of the modulator and locking; if determining that the difference value between the detection value and the target value is not less than the set threshold according to the comparison result, adjusting the phase delay offset point corresponding to the modulator within the range of the difference value; and after adjusting the phase delay offset point corresponding to the modulator, returning to the step of acquiring the backlight detection current signals output from the modulator in different working states, that is, returning to the Step 101.

Control mode 3: controlling according to the historic comparison result and the current comparison result, specifically:

before controlling the position of the phase delay offset point corresponding to the modulator according to the comparison result, judging whether there is a saved comparison result between the detection value that is determined before the determination of this detection value and the set target value of the phase delay offset point, if so, acquiring the historic comparison result, and selecting one comparison result with less difference value from the saved comparison result and the current comparison result to control the position of the phase delay offset point corresponding to the modulator; if not, controlling according to the current comparison result. The specific control process of controlling the offset point of the modulator according to the historic comparison result or current comparison result is consistent to the basic principle of the control mode 1 or control mode 2, and it will not be described herein again.

The method for controlling the phase delay offset point of the modulator provided in the embodiment of the present invention is particularly suitable to a lithium niobate modulator in a DQPSK modulation system. On one hand, the accuracy of controlling the phase delay offset point can be improved, and on the other hand, the method has relatively high flexibility and the implementation is simple. In order to understand the embodiments of the present invention better, detailed description will be given below by taking the lithium niobate modulator as example.

Figure 2:
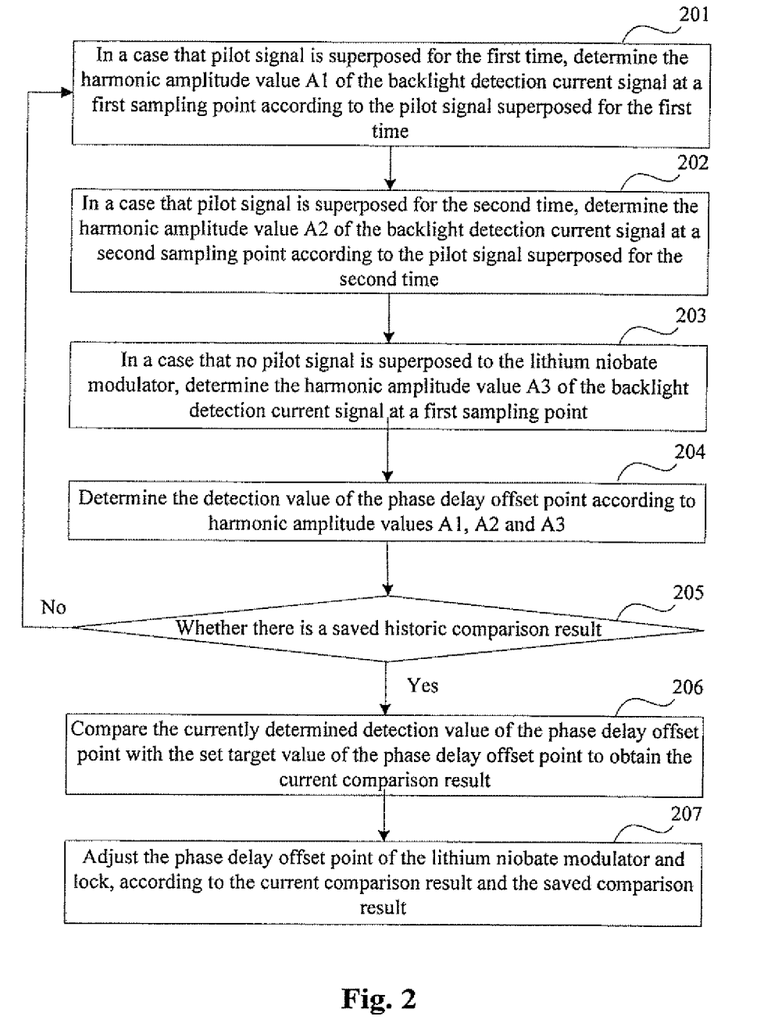
FIG. 2 is a flow chart of a method for controlling the phase delay offset point of a modulator based on control mode 3 in accordance with an embodiment of the present invention.

FIG. 2 is a flow chart of a method for controlling the phase delay offset point of a modulator based on control mode 3 in accordance with an embodiment of the present invention. As shown in FIG. 2, the method comprises the following steps.

Step 201: In a case that pilot signal is superposed to the lithium niobate modulator for the first time, the harmonic amplitude value A1 of the backlight detection current signal at a first sampling point is determined according to the pilot signal superposed for the first time.

Step 202: In a case that a second pilot signal is superposed to the lithium niobate modulator, the harmonic amplitude value A2 of the backlight detection current signal at a second sampling point is determined according to the second superposed pilot signal.

Step 203: In a case that no pilot signal is superposed to the lithium niobate modulator, the harmonic amplitude value A3 of the backlight detection current signal at a third sampling point is determined.

Step 204: The detection value of the phase delay offset point is determined according to the harmonic amplitude values A1, A2 and A3.

Step 205: It is judged whether there is a saved comparison result (historic comparison result) between a detection value of the phase delay offset point that is determined before the current determination and the set target value of the phase delay offset point, if so, execute Step 206, if not, return to Step 201.

Step 206: The currently determined detection value of the phase delay offset point is compared with the set target value of the phase delay offset point to obtain the current comparison result.

Step 207: The phase delay offset point of the lithium niobate modulator is adjusted according to the current comparison result and the saved comparison result and locked.

In the above flow, there is no specific execution order for Step 201, Step 202 and Step 203, the above definition is only provided for convenient description. That is, Step 201, Step 202 and Step 203 can be executed in different orders, for example, the execution order can be adjusted as Step 202, Step 201 and Step 203, or as Step 203, Step 201 and Step 202, and there is no need to enumerate all the orders here.

The specific process in Step 201 is described as follows.

Pilot signals are respectively superposed on I and Q paths of offset voltage signals of the lithium niobate modulator at the sending end of the DQPSK modulation system. It is assumed that the output frequency of the pilot signal superposed for the first time is ω and the phase shift is 0.

Figure 3:
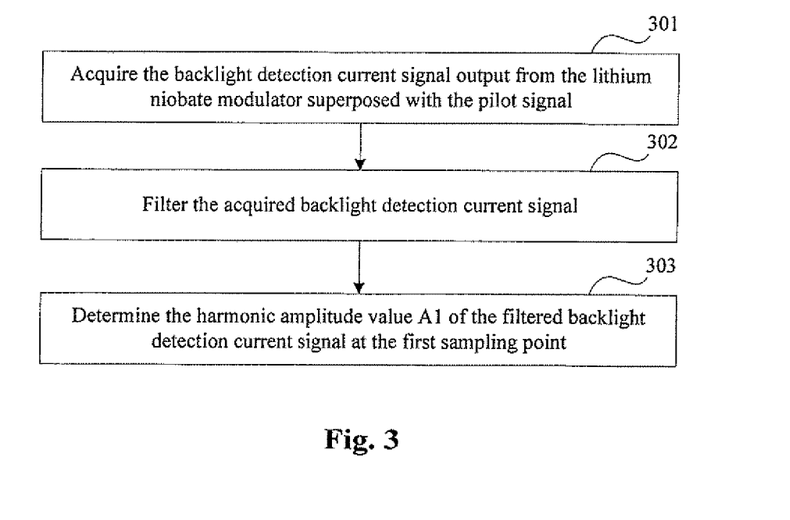
FIG. 3 is a flow chart of a method for determining the harmonic amplitude values of backlight detection current signals in accordance with an embodiment of the present invention.

Further, according to the pilot signal superposed for the first time, the harmonic amplitude value A1 of the backlight detection current signal at the first sampling point is determined, specifically as shown in FIG. 3. FIG. 3 is a flow chart of a method for determining the harmonic amplitude value of the backlight detection current signal in accordance with an embodiment of the present invention, and the method comprises the following steps.

Step 301: The backlight detection current signal output from the lithium niobate modulator superposed with the pilot signal is acquired.

Step 302: The acquired backlight detection current signal is filtered.

In Step 302, the acquired backlight detection current signal can be filtered by a narrow-band band-pass filter, the centre frequency of which is equal to the output frequency of the superposed pilot signal, that is, the acquired backlight detection current signal is filtered by taking the output frequency of the superposed pilot signal as the centre point. According to the pilot signal input this time, the centre frequency of the narrow-band band-pass filter employed here is ω.

Step 303: The harmonic amplitude value A1 of the filtered backlight detection current signal at the first sampling point is determined.

In Step 303, the pilot signal is detected, and, the harmonic amplitude value of the backlight detection current signal at the first sampling point is the harmonic amplitude value A1 of the backlight detection current signal corresponding to a case that the phase shift of the detected pilot signal is equal to the phase shift of the pilot signal superposed this time. According to the pilot signal input this time, the corresponding harmonic amplitude value of the backlight detection current signal obtained when the phase shift of the pilot signal is detected as 0 is determined as the final harmonic amplitude value A1 to be obtained.

In the flow shown in FIG. 2, the specific execution process of Step 202 is generally consistent to the specific execution process of Step 201. In Step 202, the output powers employed for the pilot signal input for the second time and the pilot signal input for the first time are identical, but the phase shifts are different. For example, the phase shift of the pilot signal input for the second time is θ, and θ≈0. Furthermore, according to the pilot signal input for the second time, the harmonic amplitude value of the backlight detection current signal at the second sampling point is the harmonic amplitude value A2 of the backlight detection current signal corresponding to a case that the phase shift of the pilot signal is detected to be equal to θ.

It should be understood that, in the embodiments of the present invention, setup for the pilot signal superposed for the first time and setup for the pilot signal superposed for the second time are only preferable embodiments of the present invention. The phase shift of one of the pilot signals superposed for the two times is set as 0 to reduce the computation. During the practical application, it is only needed to ensure that the pilot signals superposed for the two times use different phase shifts, for example, the phase shift used for the pilot signal superposed for the first time is θ$_1$, the phase shift used for the pilot signal superposed for the second time is θ$_2$, wherein θ$_1$≈θ$_2$. The setup for the pilot signals will not be described again here.

Figure 4:
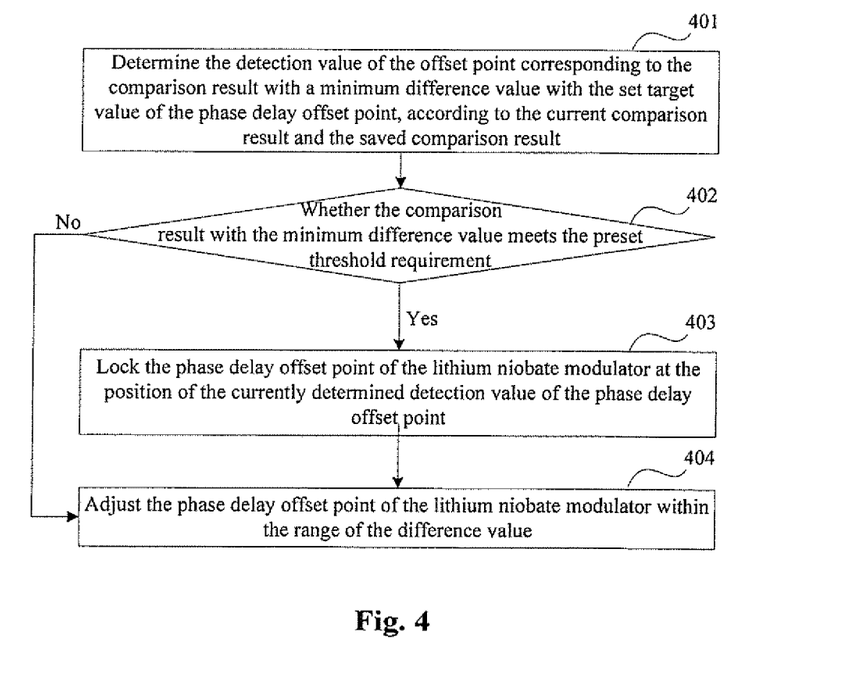
FIG. 4 is a flow chart of a method for controlling the offset point of a lithium niobate modulator according to the comparison result in accordance with an embodiment of the present invention.

In the flow shown in FIG. 2, the specific execution process of Step 207 is mainly completed via a feedback control algorithm, and the specific processing process is as shown in FIG. 4. FIG. 4 is a flow chart of a method for controlling the offset point of a lithium niobate modulator according to the comparison result in accordance with an embodiment of the present invention, and the method comprises the following steps.

Step 401: The detection value of the offset point corresponding to the comparison result with a minimum difference value with the set target value of the phase delay offset point is determined according to the current comparison result and the saved comparison result.

In this step, the current comparison result is the comparison result between the currently determined detection value φ$_i$ of the phase delay offset point and the set target value φ$_{IQ}$ of the phase delay offset point, and the saved comparison result is the comparison result between the detection value φ$_{i-n}$ of the phase delay offset point determined before the currently determined detection value and the set target value φ$_{IQ}$ of the phase delay offset point.

Step 402: It is judged whether the comparison result with the minimum difference value meets a preset threshold requirement, if so, execute Step 403, and if not, execute Step 404.

Step 403: The phase delay offset point of the lithium niobate modulator is locked at the position of the currently determined detection value of the phase delay offset point.

Step 404: The phase delay offset point of the lithium niobate modulator is adjusted within the range of the difference value.

After Step 404 is executed, further return to Step 201.

The above contents describe the basic principle of controlling the phase delay offset point of a modulator in the embodiments of the present invention, and the specific control process will be described in details below.

Figure 5:
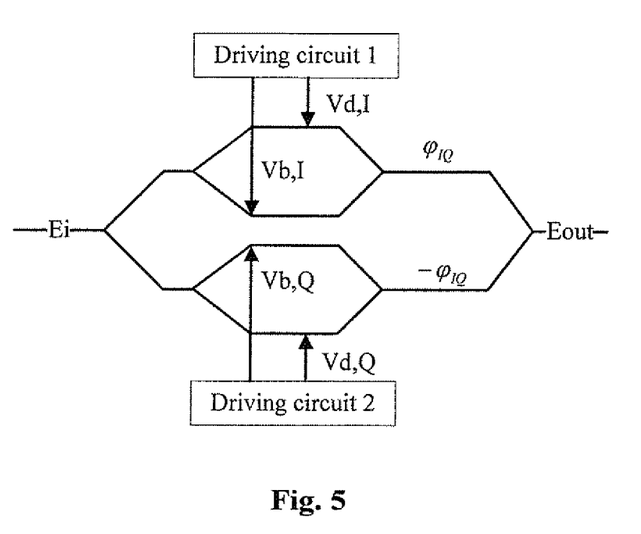
FIG. 5 is a basic structure diagram of a lithium niobate modulator in accordance with an embodiment of the present invention.

At the sending end of the DQPSK system, optical phase modulation is generally implemented by a lithium niobate modulator. FIG. 5 is a basic structure diagram of a lithium niobate modulator in accordance with an embodiment of the present invention, as shown in FIG. 5, it can be known by analysis according to the structure shown in FIG. 5:

$$|E_{out}|^2 = \frac{|E_i|^2}{4}\left[\sin^2\frac{\pi(V_{d,I} + V_{b,I})}{2V_{\pi,I}} + \sin^2\frac{\pi(V_{d,Q} + V_{b,Q})}{2V_{\pi,Q}} - 2\sin\frac{\pi(V_{d,I} + V_{b,I})}{2V_{\pi,I}}\sin\frac{\pi(V_{d,Q} + V_{b,Q})}{2V_{\pi,Q}}\cos 2\varphi_{IQ}\right] \quad \text{Formula (1)}$$

wherein $V_{d,I}, V_{\pi,I}, V_{b,I}$ respectively refer to a modulation amplitude, $V_\pi$ voltage and an offset voltage of the I-path;

$V_{d,Q}, V_{\pi,Q}, V_{b,Q}$ respectively refer to a modulation amplitude, $V_\pi$ voltage and an offset voltage of the Q-path.

For DQPSK modulation, by controlling the position of the phase delay offset point of the lithium niobate modulator, the set conditions are met:

$$V_{d,I} = \pm V_{\pi,I}, V_{b,I} = 0; V_{d,Q} = \pm V_{\pi,Q}, V_{b,Q} = 0 \quad \text{Formula (2)}$$

$$2\varphi_{IQ} = \frac{\pi}{2} \quad \text{Formula (3)}$$

The control of offset points $V_{b,I}$ and $V_{b,Q}$ can be executed in a general method, and $V_{d,I}=\pm V_{\pi,I}$ and $V_{d,Q}=\pm V_{\pi,Q}$ can be met by controlling the amplitude of RF signals input to the modulator. In an embodiment of the present invention, in order to implement the control of an offset point with $$\varphi_{IQ} = \frac{\pi}{4},$$

first, the pilot signal A cos ωt is respectively superposed to I and Q paths of offset voltage signals of the lithium niobate modulator, the additional phase difference introduced by the pilot signal between I and Q arms is $$\frac{A\pi}{V_\pi}\cos\omega t = k\cos\omega t\left(\text{wherein } k = \frac{A\pi}{V_\pi}\right),$$

therefore, the output light intensity expressed in Formula (1) after superposition of the pilot signal is:

$$|E_{out}|^2 = \frac{|E_i|^2}{4}\left[\sin^2\frac{\pi(V_{d,I}+V_{b,I})}{2V_{\pi,I}} + \sin^2\frac{\pi(V_{d,Q}+V_{b,Q})}{2V_{\pi,Q}} - 2\sin\frac{\pi(V_{d,I}+V_{b,I})}{2V_{\pi,I}}\sin\frac{\pi(V_{d,Q}+V_{b,Q})}{2V_{\pi,Q}}\cos(2\varphi_{IQ}+k\cos\omega t)\right]$$

This formula is substituted to Formula (2) to obtain:

$$\sin^2\frac{\pi(V_{d,I}+V_{b,I})}{2V_{\pi,I}} = \sin^2\frac{\pi(V_{d,Q}+V_{b,Q})}{2V_{\pi,Q}} = 1$$

i.e.:

$$|E_{out}|^2 = \frac{|E_i|^2}{4}[2 \pm 2\cos(2\varphi_{IQ}+k\cos\omega t)] = A_1 \quad \text{Formula (4)}$$

Then, the phase of the superposed pilot signal is changed to make it shift by θ (for example, shift by π), that is, at this moment, the superposed pilot signal is A cos(ωt+θ), therefore, the output light intensity expressed in Formula (1) after superposition of the pilot signal is:

$$|E_{out}|^2 = \frac{|E_i|^2}{4}[2 \pm 2\cos(2\varphi_{IQ}+k\cos(\omega t+\theta))] = A_2 \quad \text{Formula (5)}$$

Finally, when no pilot signal is superposed, the output light intensity expressed in Formula (1) is:

$$|E_{out}|^2 = \frac{|E_i|^2}{4}(2 \pm 2\cos 2\varphi_{IQ}) = A_3 \quad \text{Formula (6)}$$

Formulas (4), (5) and (6) are jointly solved to obtain the value $\phi_{IQ}$, i.e., the detection value of the phase delay offset point.

Then, the detection value $\phi_{IQ}$ obtained by joint resolution is compared with the set target value, and the modulator can be locked at any position according to requirements by adjusting the voltage of the offset point. Generally, for the DQPSK, $$2\varphi_{IQ} = \frac{\pi}{2}$$

can be selected, at this moment, the modulator is locked at the normal offset point.

Figure 6:
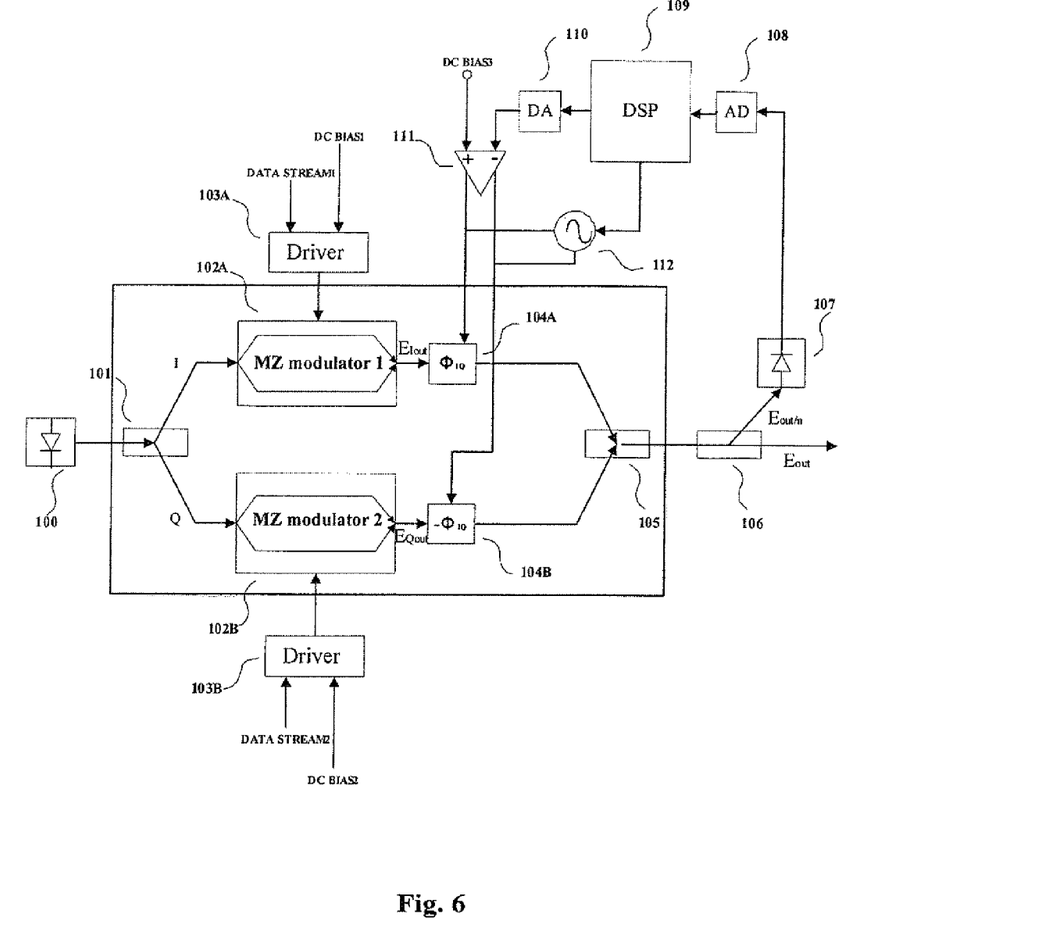
FIG. 6 is a preferable solution of controlling the phase delay offset point of a modulator in accordance with an embodiment of the present invention.

In order to implement the above technical solution of control, an embodiment of the present invention also provides the following preferable implementation solutions in combination with specific entities. FIG. 6 is a preferable solution of controlling the phase delay offset point of a modulator in accordance with the embodiment of the present invention, as shown in FIG. 6:

an optical signal from a laser (100) is divided into I and Q paths of light after passing through one 3 dB coupler (101), then the I-path of light passes through an MZ modulator 1 (102A) to output $E_{Iout}$, the MZ modulator 1 (102A) is modulated by DATASTREAM 1, and the offset point thereof is set by an external voltage (DC BIAS1). Similarly, the Q-path of light passes through an MZ modulator 2 (102B) to output $E_{Qout}$, the MZ modulator 2 (102B) is modulated by DATASTREAM 2, and the offset point thereof is set by an external voltage (DC BIAS2). $E_{Iout}$ and $E_{Qout}$ are respectively phase-delayed by $\phi_{IQ}$ (104A) and $\phi_{IQ}$ (104B), and then synthesized by a 3 dB coupler (105) and a 3 dB coupler (106) into $E_{out}$ and $E_{ouT\,In}$, wherein $E_{ouT\,In}$ is used for backlight detection in the system.

The main body for offset point control is a Digital Signal Processor (DSP) (110), it controls three high-precision DAs (114) to output two pilot signals with a frequency of ω and different phase shifts (can be respectively set as 0 and π) and one DC signal without any pilot signal, the three DAs (114) can be switched freely via a control switch (113) of the DSP (110).

When the control loop works, first, the pilot signal without phase shift is added to the two arms of the DQPSK lithium niobate modulator, after the pilot signal (the phase shift of which is 0) is superposed, the first harmonic component of the backlight detection signal (107) that is filtered by a narrow-band filter (108) is acquired and input to the DSP (110) via a high-speed high-precision AD (109), and the amplitude value A1 of the signal can be expressed by Formula (4). Then, the phase of the pilot signal is switched to make it shift by π, and the first harmonic component of the backlight detection signal is acquired and input to the DSP (110), at this moment, the amplitude value A2 of the signal is expressed by Formula (5). Finally, no pilot signal is added, and the backlight detection signal is also acquired, at this moment, the amplitude value A3 of the signal is expressed by Formula (6). Equations (4), (5) and (6) are jointly resolved in the DSP (110) to obtain the offset point $2\omega_{IQ}$ (i.e., detection value) at this moment. After the detection value is compared with the set target value, the voltage of the offset point can be adjusted via the DA (111) to adjust the offset point to the position determined according to the comparison result (for the DQPSK, the general situation is $$2\varphi_{IQ} = \frac{\pi}{2}).$$

Figure 7:
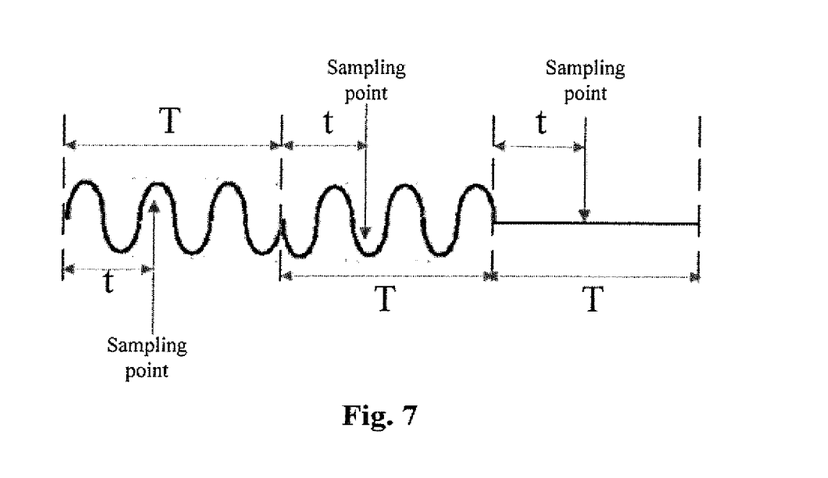
FIG. 7 is a sequence chart of the added pilot signal in accordance with an embodiment of the present invention.

The added pilot signal during the adjustment process is a time-sharing signal, the sequence of which is shown in FIG. 7, which is a sequence diagram of the added pilot signal in accordance with the embodiment of the present invention.

Figure 8:
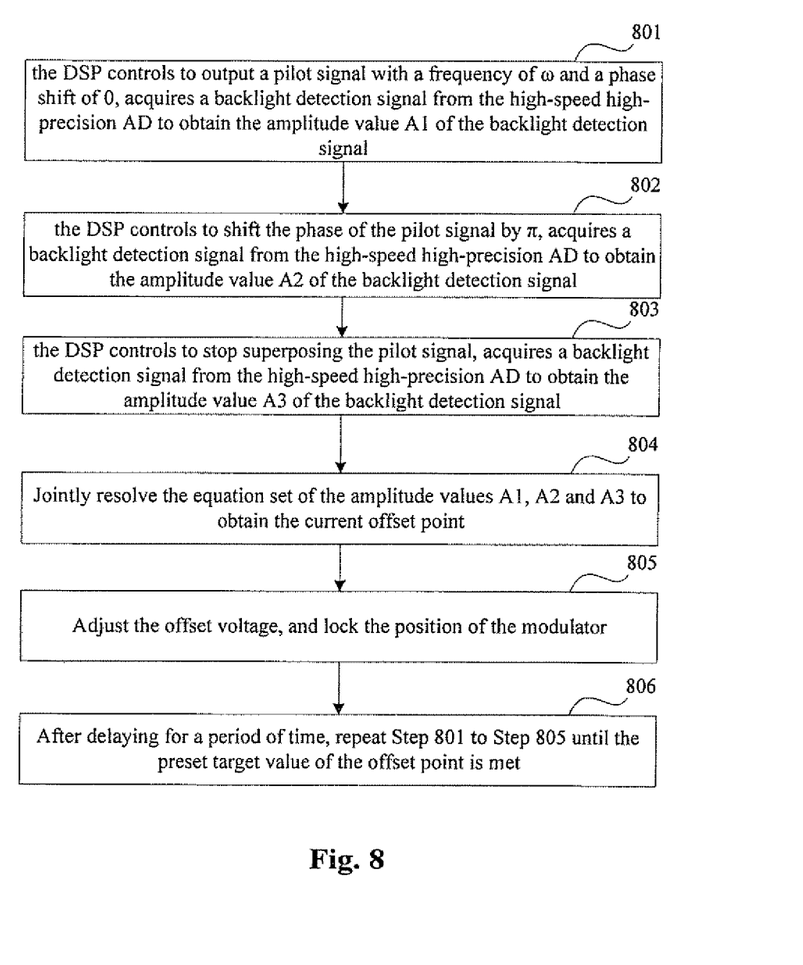
FIG. 8 is a flow chart of a control method employed in a DSP in accordance with an embodiment of the present invention.

The control process employed in the DSP is shown in FIG. 8. FIG. 8 is a flow chart of a control method employed in DSP in accordance with an embodiment of the present invention, and the method comprises the following steps.

Step 801: The DSP outputs a pilot signal with a frequency of ω and a phase shift of 0, and acquires a backlight detection signal from the high-speed high-precision AD to obtain the amplitude value A1 of the backlight detection signal.

Step 802: The DSP controls to shift the phase of the pilot signal by π, and acquires a backlight detection signal from the high-speed high-precision AD to obtain the amplitude value A2 of the backlight detection signal.

Step 803: The DSP controls to stop superposing the pilot signal, and acquires a backlight detection signal from the high-speed high-precision AD to obtain the amplitude value A3 of the backlight detection signal.

Step 804: The equation set of the amplitude values A1, A2 and A3 is jointly resolved to obtain the current offset point $2\phi_{IQ}$.

Step 805: The offset voltage is adjusted, and the position of the modulator is locked.

Step 806: After delaying for a period of time, Step 801 to Step 805 are repeated until the preset target value of the offset point is met.

Figure 9:
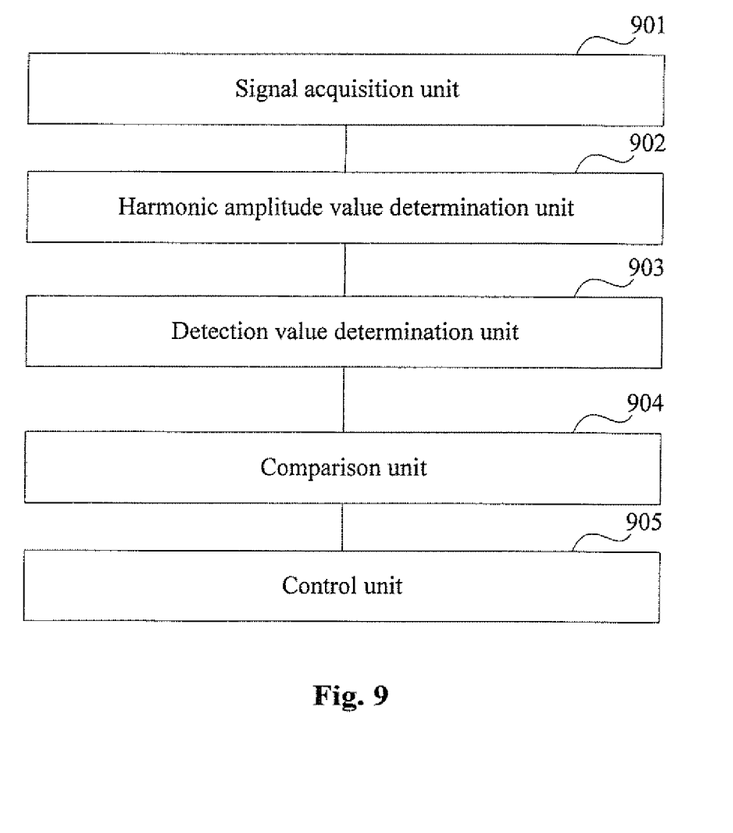
FIG. 9 is a diagram of an apparatus for controlling the phase delay offset point of a modulator in accordance with an embodiment of the present invention.

In order to implement the above method, an embodiment of the present invention also provides an apparatus for controlling the phase delay offset point of a modulator. FIG. 9 is a diagram of an apparatus for controlling the phase delay offset point of a modulator in accordance with the embodiment of the present invention. As shown in FIG. 9, the apparatus comprises:

a signal acquisition unit 901, a harmonic amplitude value determination unit 902, a detection value determination unit 903, a comparison unit 904 and a control unit 905;

wherein:

the signal acquisition unit 901 is configured to acquire backlight detection current signals output from a modulator in different working states;

the harmonic amplitude value determination unit 902 is configured to determine the harmonic amplitude values of the backlight detection current signals that are corresponding to the different working states and are acquired by the signal acquisition unit 901;

the detection value determination unit 903 is configured to determine the detection value of the phase delay offset point corresponding to the modulator according to the harmonic amplitude values determined by the harmonic amplitude value determination unit 902;

the comparison unit 904 is configured to compare the detection value determined by the detection value determination unit 903 with the set target value of the phase delay offset point; and the control unit 905 is configured to control the position of the phase delay offset point corresponding to the modulator according to the comparison result made by the comparison unit 904.

In a preferable embodiment of the present invention, the signal acquisition unit 901 is specifically configured to:

acquire backlight detection current signals output from the modulator in a state in which no pilot signal is input to the modulator and a state in which two different phase shift pilot signals are time-sharing superposed to the modulator.

In a preferable embodiment of the present invention, the signal acquisition unit 901 is specifically configured to:

acquire backlight detection current signals output from the modulator in a state in which no pilot signal is input to the modulator and a state in which two different phase shift pilot signals are time-sharing superposed to I and Q paths of offset voltage signals of the modulator.

In a preferable embodiment of the present invention, the harmonic amplitude value determination unit 902 is specifically configured to:

determine the harmonic amplitude values of the filtered backlight detection current signal corresponding to the different working states.

In a preferable embodiment of the present invention, the harmonic amplitude value determination unit 902 is specifically configured to:

determine the harmonic amplitude values of the backlight detection current signals corresponding to the different working states through the following formula:

$$|E_{out}|^2 = \frac{|E_i|^2}{4}\left[\sin^2\frac{\pi(V_{d,I}+V_{b,I})}{2V_{\pi,I}} + \sin^2\frac{\pi(V_{d,Q}+V_{b,Q})}{2V_{\pi,Q}} - 2\sin\frac{\pi(V_{d,I}+V_{b,I})}{2V_{\pi,I}}\sin\frac{\pi(V_{d,Q}+V_{b,Q})}{2V_{\pi,Q}}\cos(2\varphi_{IQ}+k\cos(\omega t+\theta))\right]$$

wherein:

$V_{d,I}, V_{\pi,I}, V_{b,I}$ respectively refer to a modulation amplitude, $V_\pi$ voltage and an offset voltage of an I-path of the modulator, and are respectively set by a system;

$V_{d,Q}, V_{\pi,Q}, V_{b,Q}$ respectively refer to a modulation amplitude, $V_\pi$ voltage and an offset voltage of a Q-path of the modulator, and are respectively set by the system;

when the corresponding working state is the state in which no pilot signal is input to the modulator, $\omega=0$, $\theta=0$;

when the corresponding working state is the state in which the two different phase shift pilot signals are time-sharing superposed to the modulator, $\omega\neq 0$.

In a preferable embodiment of the present invention, the detection value determination unit 903 is specifically configured to:

jointly resolve an equation set formed by the harmonic amplitude values of the backlight detection current signal corresponding to the different working states to obtain the detection value $2\phi_{IQ}$ of the phase delay offset point corresponding to the modulator.

In a preferable embodiment of the present invention, the control unit 905 is further configured to:

before controlling the position of the phase delay offset point corresponding to the modulator according to the comparison result, acquire a saved comparison result between a detection value that is determined before the determination of this detection value and the set target value of the phase delay offset point, and select one comparison result with less difference value from the saved comparison result and the current comparison result to control the position of the phase delay offset point corresponding to the modulator.

In a preferable embodiment of the present invention, the control unit 905 is specifically configured to:

when determining that the difference value between the detection value and the target value is less than a set threshold according to the comparison result of the comparison unit 904, control the phase delay offset point corresponding to the modulator as the current phase delay offset point of the modulator and lock;

when determining that the difference value between the detection value and the target value is not less than the set threshold according to the comparison result of the comparison unit 904, adjust the phase delay offset point corresponding to the modulator within the range of the difference value.

In a preferable embodiment of the present invention, the control unit 905 is further configured to:

after adjusting the phase delay offset point corresponding to the modulator, control the signal acquisition unit 901 to acquire the backlight detection current signals output from the modulator, the phase delay offset point of which is adjusted, in the different working states.

It should be understood that, units included in the apparatus for controlling the phase delay offset point of the modulator are just logically divided according to the implementation functions of the apparatus, and the units may be superposed or split during the practical application. Furthermore, the functions implemented by the apparatus provided in the embodiments is one-to-one corresponding to the flows of the method for controlling the phase delay offset point of the modulator provided in the above embodiments, more detailed processing flows implemented by the apparatus have been described in details in the embodiments of the method and will not be described again here.

In combination with a practical DQPSK system, an embodiment of the present invention also provides a system for controlling the phase delay offset point of a modulator, comprising the following parts:

a narrow-band band-pass filter with a centre frequency of co, configured to filter to obtain the first harmonic amplitude value of the backlight detection current signal;

a high-speed high-precision AD, configured to collect the first harmonic amplitude value of the backlight detection signal into a digital algorithm processing unit;

the digital algorithm processing unit (for example, DSP, FPGA), configured to generate and switch pilot signals and implement the feedback control algorithm;

a high-speed high-precision DA, configured to convert the digital pilot signals generated by the digital algorithm processing unit into analogue pilot signals, and return the feedback amount from the digital algorithm processing unit to the lithium niobate modulator; and a digital control switch, configured to time-sharing switch the pilot signals.

Through at least one technical solution provided in the embodiments of the present invention, according to the backlight detection current signals output from a modulator in different working states, the respective harmonic amplitude values are determined, further a detection value of the phase delay offset point is determined according to the determined harmonic amplitude values, and the position of the phase delay offset point corresponding to the modulator is controlled according to the comparison between the detection value and the set target value of the phase delay offset point. According to the technical solution, on one hand, the position of the offset point is controlled according to the value output from the modulator in the practical working state, in consideration of interference from various external factors to the modulator; on the other hand, the working state of the modulator can be set flexibly, and the test value of the phase delay offset point can be determined in combination of output values in various working states, so that the accuracy of controlling the position of the phase delay offset point of the modulator and the performance of the DQPSK system are improved.

Further, in the embodiments of the present invention, the phase delay offset point of the DQPSK lithium niobate modulator can be locked to the right position, in comparison with other control methods through which the offset point can only be locked to a particular position, through the technical solutions provided in the embodiments of the present invention, the offset point can be locked to any value, on the basis of improving the control precision, the position of the offset point can be controlled more conveniently and flexibly, the applicability is high, and digital implementation is facilitated; when compared with other systems, the technical solutions have quite obvious cost advantage, and the control method is also relatively flexible and simple.

Further, as the DQPSK lithium niobate modulator can be locked to the right offset point, and simultaneously, the cost is relatively low, the technical solutions provided in the embodiments of the present invention are important to 40 G dense wavelength division system.

Obviously, for those skilled in the art, the present invention may have various changes and modifications within the scope of the present invention. If these changes and modifications of the present invention fall into the scope defined by the claims of the present invention and its equivalent techniques, the present invention is intended to include these changes and modifications.

What is claimed is:

1. A method for controlling a phase delay offset point of a modulator, comprising:

acquiring backlight detection current signals output from the modulator in different working states, and determining harmonic amplitude values of the backlight detection current signals corresponding to the different working states;

determining a detection value of the phase delay offset point corresponding to the modulator according to the determined harmonic amplitude values; and comparing the detection value with a set target value of the phase delay offset point, and controlling a position of the phase delay offset point corresponding to the modulator according to a comparison result;

wherein before the step of controlling the position of the phase delay offset point corresponding to the modulator according to the comparison result, the method further comprises:

acquiring a saved comparison result between a detection value that is determined before a determination of a current detection value and the set target value of the phase delay offset point, and selecting one comparison result with a less difference value between the saved comparison result and a current comparison result to control the position of the phase delay offset point corresponding to the modulator.

2. The method according to claim 1, wherein the different working states respectively are: a state in which no pilot signal is input to the modulator; and a state in which two different phase shift pilot signals are time-sharing superposed to the modulator;

the harmonic amplitude values of the backlight detection current signals corresponding to the different working states are determined through the following formula:

$$|E_{out}|^2 = \frac{|E_i|^2}{4}\left[\sin^2\frac{\pi(V_{d,I}+V_{b,I})}{2V_{\pi,I}} + \sin^2\frac{\pi(V_{d,Q}+V_{b,Q})}{2V_{\pi,Q}} - 2\sin\frac{\pi(V_{d,I}+V_{b,I})}{2V_{\pi,I}}\sin\frac{\pi(V_{d,Q}+V_{b,Q})}{2V_{\pi,Q}}\cos(2\varphi_{IQ}+k\cos(\omega t+\theta))\right]$$

wherein $V_{d,I}, V_{\pi,I}, V_{b,I}$ respectively refer to a modulation amplitude, $V_\pi$ voltage of an I-path of the modulator, and an offset voltage of an I-path of the modulator, and $V_{d,I}, V_{\pi,I}, V_{b,I}$ are respectively set by a system;

$V_{d,Q}, V_{\pi,Q}, V_{b,Q}$ respectively refer to a modulation amplitude, $V_\pi$ voltage of a Q-path of the modulator and an offset voltage of a Q-path of the modulator, and $V_{d,Q}, V_{\pi,Q}, V_{b,Q}$ are respectively set by the system;

when the corresponding working state is the state in which no pilot signal is input to the modulator, $\omega=0$, $\theta=0$;

when the corresponding working state is the state in which the two different phase shift pilot signals are time-sharing superposed to the modulator, $\omega\neq 0$.

3. The method according to claim 2, wherein the step of determining the detection value of the phase delay offset point corresponding to the modulator according to the determined harmonic amplitude values comprises:

determining the detection value $2\phi_{IQ}$ of the phase delay offset point corresponding to the modulator according to formulas respectively corresponding to the harmonic amplitude values of the backlight detection current signals corresponding to the different working states.

4. The method according to claim 1, wherein the step of controlling the position of the phase delay offset point corresponding to the modulator according to the comparison result comprises:
if determining that a difference value between the detection value and the target value is less than a set threshold according to the comparison result, controlling the phase delay offset point corresponding to the modulator as a current phase delay offset point of the modulator and locking;
if determining that the difference value between the detection value and the target value is not less than the set threshold according to the comparison result, adjusting the phase delay offset point corresponding to the modulator within a range of the difference value, or, adjusting the phase delay offset point corresponding to the modulator within the range of the difference value and returning to the step of acquiring the backlight detection current signals output from the modulator in different working states.

5. The method according to claim 1, wherein the step of controlling the position of the phase delay offset point corresponding to the modulator according to the comparison result comprises:
if determining that a difference value between the detection value and the target value is less than a set threshold according to the comparison result, controlling the phase delay offset point corresponding to the modulator as a current phase delay offset point of the modulator and locking;
if determining that the difference value between the detection value and the target value is not less than the set threshold according to the comparison result, adjusting the phase delay offset point corresponding to the modulator within a range of the difference value, or, adjusting the phase delay offset point corresponding to the modulator within the range of the difference value and returning to the step of acquiring the backlight detection current signals output from the modulator in different working states.

6. An apparatus for controlling a phase delay offset point of a modulator, comprising: a signal acquisition unit, a harmonic amplitude value determination unit, a detection value determination unit, a comparison unit and a control unit; wherein
the signal acquisition unit is configured to acquire backlight detection current signals output from the modulator in different working states;
the harmonic amplitude value determination unit is configured to determine harmonic amplitude values of the backlight detection current signals that are corresponding to the different working states and are acquired by the signal acquisition unit;
the detection value determination unit is configured to determine a detection value of the phase delay offset point corresponding to the modulator according to the harmonic amplitude values determined by the harmonic amplitude value determination unit;
the comparison unit is configured to compare the detection value determined by the detection value determination unit with a set target value of the phase delay offset point; and the control unit is configured to control a position of the phase delay offset point corresponding to the modulator according to a comparison result made by the comparison unit:
wherein the control unit is further configured to:
before controlling the position of the phase delay offset point corresponding to the modulator according to the comparison result, acquire a saved comparison result between a detection value that is determined before a determination of a current detection value and the set target value of the phase delay offset point, and select one comparison result with a less difference value between the saved comparison result and a current comparison result to control the position of the phase delay offset point corresponding to the modulator.

7. The apparatus according to claim 6, wherein
the signal acquisition unit is specifically configured to: acquire the backlight detection current signals output from the modulator in a state in which no pilot signal is input to the modulator and a state in which two different phase shift pilot signals are time-sharing superposed to the modulator;
the harmonic amplitude value determination unit is specifically configured to: determine the harmonic amplitude values of the backlight detection current signals corresponding to the different working states through the following formula:

$$|E_{out}|^2 = \frac{|E_i|^2}{4}\left[\sin^2\frac{\pi(V_{d,I}+V_{b,I})}{2V_{\pi,I}} + \sin^2\frac{\pi(V_{d,Q}+V_{b,Q})}{2V_{\pi,Q}} - 2\sin\frac{\pi(V_{d,I}+V_{b,I})}{2V_{\pi,I}}\sin\frac{\pi(V_{d,Q}+V_{b,Q})}{2V_{\pi,Q}}\cos(2\varphi_{IQ}+k\cos(\omega t+\theta))\right]$$

wherein
$V_{d,I}, V_{\pi,I}, V_{b,I}$ respectively refer to a modulation amplitude, $V_\pi$ voltage of an I-path of the modulator and an offset voltage of an I-path of the modulator, and $V_{d,I}, V_{\pi,I}, V_{b,I}$ are respectively set by a system;
$V_{d,Q}, V_{\pi,Q}, V_{b,Q}$ respectively refer to a modulation amplitude, $V_\pi$ voltage of a Q-path of the modulator and an offset voltage of a Q-path of the modulator, and $V_{d,Q}, V_{\pi,Q}, V_{b,Q}$ are respectively set by the system;
when the corresponding working state is the state in which no pilot signal is input to the modulator, $\omega=0$, $\theta=0$;
when the corresponding working state is the state in which the two different phase shift pilot signals are time-sharing superposed to the modulator, $\omega \neq 0$.

8. The apparatus according to claim 7, wherein
the detection value determination unit is specifically configured to: determine the detection value $2\phi_{IQ}$ of the phase delay offset point corresponding to the modulator according to formulas respectively corresponding to the harmonic amplitude values of the backlight detection current signals corresponding to the different working states.

9. The apparatus according to claim 6, wherein the control unit is specifically configured to:
when determining that a difference value between the detection value and the target value is less than a set threshold according to the comparison result, control the phase delay offset point corresponding to the modulator as a current phase delay offset point of the modulator and lock;

when determining that the difference value between the detection value and the target value is not less than the set threshold according to the comparison result, adjust the phase delay offset point corresponding to the modulator within a range of the difference value; or, adjust the phase delay offset point corresponding to the modulator within the range of the difference value, and after adjusting the phase delay offset point corresponding to the modulator, control the signal acquisition unit to acquire the backlight detection current signals output from the modulator, the phase delay offset point of which is adjusted, in the different working states.

* * * * *